United States Patent [19]

Hansen

[11] 4,283,965
[45] Aug. 18, 1981

[54] HAND AND FOOT THROTTLE CONTROL

[75] Inventor: Kenneth N. Hansen, Waukesha, Wis.

[73] Assignee: Allis-Chalmers Corporation, Milwaukee, Wis.

[21] Appl. No.: 72,235

[22] Filed: Sep. 4, 1979

[51] Int. Cl.³ .................... G05G 1/14; G05G 11/00
[52] U.S. Cl. ................................. 74/482; 74/513
[58] Field of Search ..................... 74/481, 482, 513

[56] References Cited
U.S. PATENT DOCUMENTS

| 1,373,600 | 4/1921 | Cornfield | 74/482 |
| 1,444,117 | 2/1923 | Hadden | 74/482 |
| 2,429,714 | 10/1947 | Gedstad | 74/482 |
| 3,002,397 | 10/1961 | Du Shane et al. | 74/482 |
| 3,508,454 | 4/1970 | Fanslow et al. | 74/482 |
| 3,511,105 | 5/1970 | Matter | 74/481 |
| 4,059,025 | 11/1977 | Waack | 74/513 |

Primary Examiner—Allan D. Herrmann
Attorney, Agent, or Firm—Arthur L. Nelson

[57] ABSTRACT

A hand throttle and foot accelerator control with sound attenuating drive means extending through the firewall for operating the engine throttle.

10 Claims, 4 Drawing Figures

HAND AND FOOT THROTTLE CONTROL

This invention relates to a throttle control and more particularly to a hand and foot operated throttle control having a drive means with sound attenuating means extending through the firewall. A throttle operating mechanism is positioned in front of the firewall which has an adjustment for control of the stroke for operating a fuel pump on either side of the engine.

A throttle control on engines used in tractors may be operated through a hand throttle or a foot accelerator depending on the type of work required by the tractor. Normally, a hand control has been used on tractors and has been adequate. However, when the speed of the tractor is varied in response to the working conditions or driving the tractor on a road, a foot accelerator has an added convenience. Accordingly, this invention provides for a hand throttle and a foot accelerator to control the engine speed on the tractor. The foot accelerator overtravels the hand throttle to accelerate in response to movement of the foot with a return spring to return the accelerator to a low speed when the foot is removed from the pedal. The hand throttle can be moved to any position and can be set in any position desired. The hand throttle is retained in the set position by a friction plate and braking washers which engage the plate to retain it in the set position. To provide complete control on the foot pedal accelerator, the hand throttle is returned to the retracted position and the foot pedal movement controls the engine speed independently.

The operation of the throttle and accelerator is provided through a pivotal shaft extending through the firewall with bearing assemblies to attenuate sound transmission through the firewall and eliminate any openings normally required by the throttle linkages. This device provides for a hand throttle and foot accelerator in combination with a sound attenuating mechanism to reduce the noise level at the operator station.

It is an object of the invention to provide a hand throttle and foot accelerator control with sound attenuating means.

It is another object of this invention to provide a hand and foot throttle control supported on a firewall with sound attenuating bearings carrying a shaft for transmitting motion from the operator station through the firewall to the engine compartment.

It is a further object of this invention to provide a hand and foot throttle control supported on the firewall with sound attenuating bearings carrying a shaft for transmission of the actuating motion from the operator station through the firewall to operate a fuel metering device. An adjustment of the stroke of the metering device to control the fuel flow and engine speed is provided with means to accommodate positioning of the fuel metering device on either side of the engine.

The objects of this invention are accomplished by providing a hand and foot throttle control supported on the firewall by sound attenuating bearings. The operating linkage is positioned on the operator side of the firewall and the throttle control mechanism is on the engine side of the firewall. The throttle control mechanism will accommodate varying strokes or movement of the mechanism to control the quantity of fuel injection and to accommodate mounting of the fuel injection pump on either side of the engine. A movement from the hand throttle and foot accelerator is transmitted through a pivotal shaft with fluid tight bearings to attenuate sound transmission through the firewall and to provide a drive mechanism to oprate the fuel metering device on the engine side of the firewall.

Referring to the drawings, the preferred embodiment of this invention is illustrated.

Figure 1:
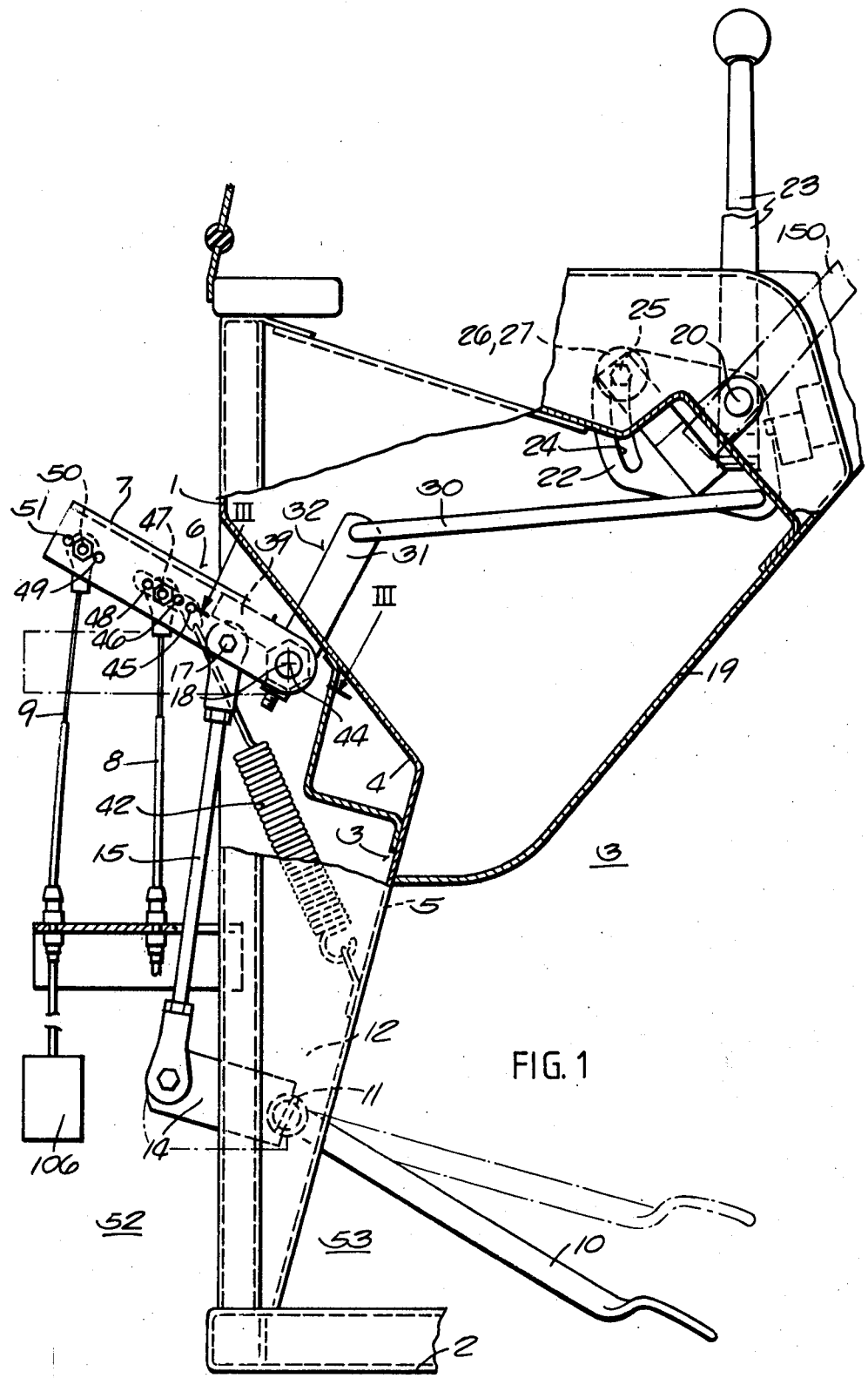
FIG. 1 illustrates a side elevation view partially in cross section of the hand throttle and foot pedal accelerator and connecting mechanism.
Figure 2:
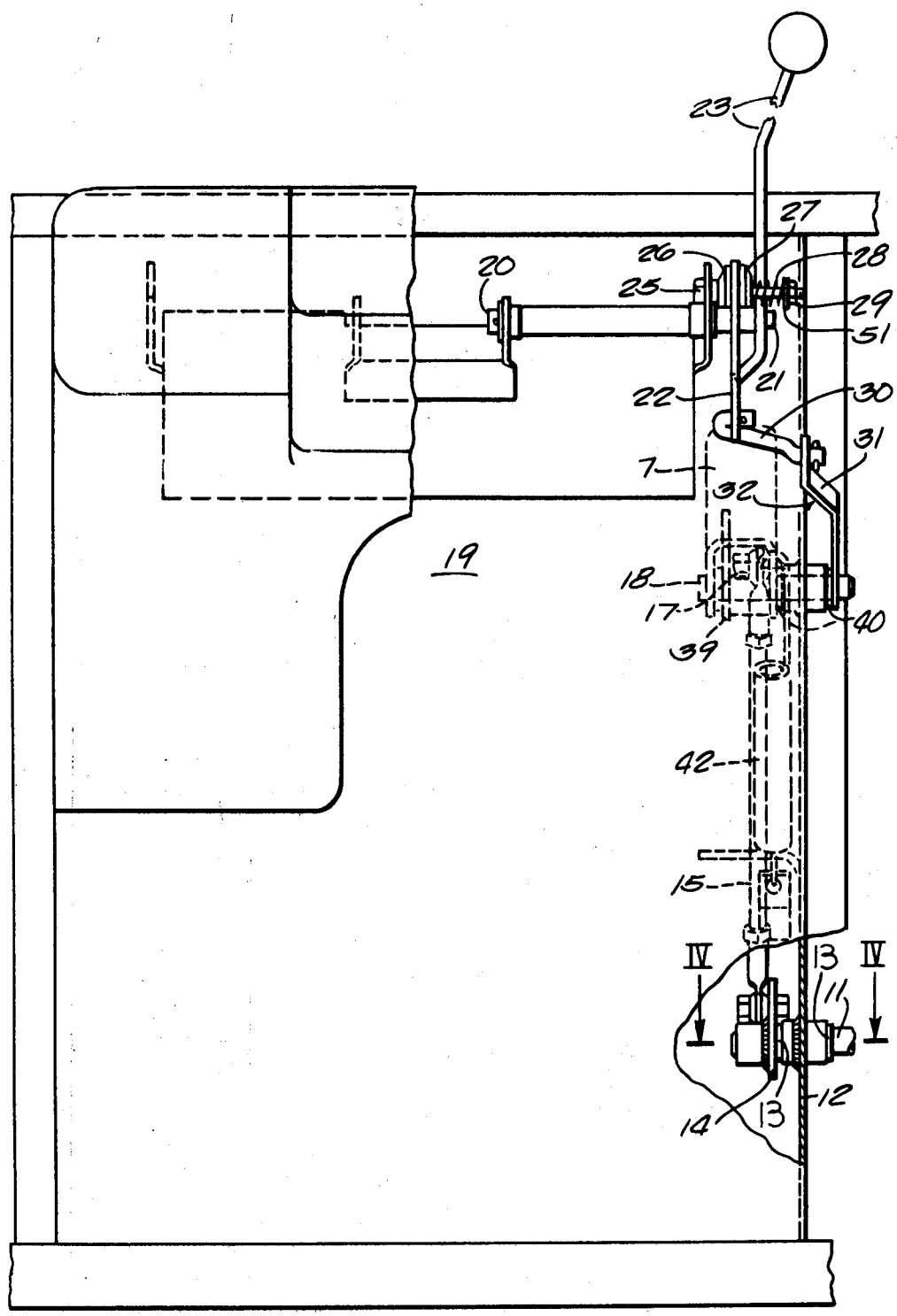
FIG. 2 is a rear view of the hand throttle and foot pedal accelerator and connecting mechanism.
Figure 3:
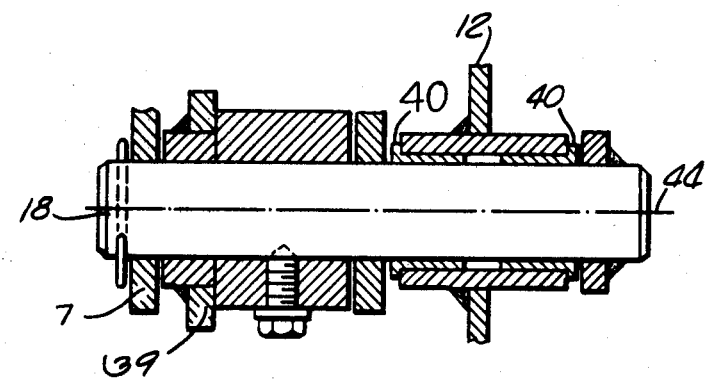
FIG. 3 is a cross section view of the hand throttle motion transmitting shaft taken on line III—III of FIG. 1.
Figure 4:
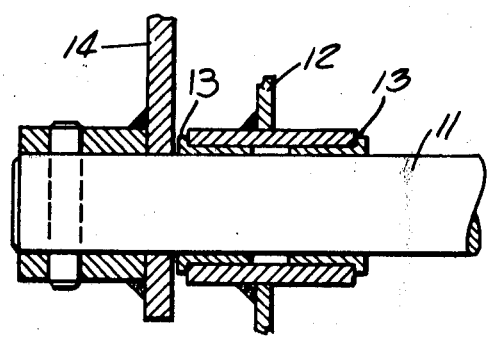
FIG. 4 is a cross section view on line IV—IV of FIG. 2 showing the foot pedal motion transmitting shaft extending through the firewall.

Referring to FIGS. 1 and 2, the firewall 1 and the platform 2 define the forward and underside of the operator station. The firewall 1 is formed with a recess 3 by the recessed walls 4 and 5. The recess receives the fuel metering mechanism 6 having a fuel metering arm 7 connected to cable assemblies 8 or 9 depending on the fuel metering device 106 used.

The accelerator pedal 10 is pivotally mounted on the motion transmitting shaft 11 mounted on the side wall 12. The motion transmitting shaft 11 is journalled in a bushing bearing 13 mounted on the side wall 12. The shaft 11 extends into the recess 3 and is integral with the arm 14 which is pivotally connected to the push rod 15. The push rod 15 is also pivotally connected to the lift arm 7 by the bolt 17. The lift arm 7 is pivotally mounted on the shaft 18 for movement in response to manual operation of the accelerator pedal 10.

The control console 19 is mounted on the firewall and extends into the passenger compartment of operator station 103. The control console 19 supports the shaft 20 and bolt 21 which pivotally support the friction plate 22 and throttle lever 23. The throttle lever 23 is bolted to the shaft 20 by the bolt 21. Friction plate 22 is formed with an arcuate slot 24 for receiving the bolt 25 carrying the friction washers 26 and 27. The spring 28 and nut 29 provide the proper tension on the friction washer 26 and 27.

As the throttle lever 23 is pivoted, the friction plate 22 pivots about its pivotal axis defined by shaft 20 and the bolt 25 moves through the acruate slot 24 of the friction plate 22. The friction plate 22 is connected through the throttle link 30 to the arm 31 of the bell crank 32. Bell crank 32 includes the shaft 18 which extends through the firewall 12 and is connected to the arm 39. The shaft 18 pivots in the bearings 40 which are bushing type bearings that seal the shaft in the bearing assembly. Th arm 39 pivots inside of the lift arm 7 which has a U-shaped cross section and is pivoted by the accelerator pedal 10. The arm 39 pivots with the shaft 18 to raise the lift arm 7 against the force of the return spring 42. As the arm 39 is counterrotated, the lift arm 7 bearing against the arm 39 lowers the lift arm 7 to its return position.

The accelerator pedal 10 is integral with the shaft 11 and the arm 14. As the pedal is depressed, the arm 14 pivots upwardly raising the push rod 15 and raising the lift link 7 to operate the fuel metering device through a suitable sheath cable 8 or 9.

The accelerator pedal 10 is positioned within the passenger compartment as well as the throttle lever 23. Both the throttle lever 23 and the accelerator pedal 10 operate through shafts 18 and 11 to transmit the operating force externally of the passenger compartment. The fuel metering mechanism operating by the pedal and the lever move the lift link which is positioned in the recess 3 of the firewall. The lift link 7 extends from its pivot point defined by the pivotal axis 44 to raise and lower the lift link 7. Positioned along the length of the lift link 7 are openings 45, 46, 47, 48, 49, 50 and 51. A selected one of the openings may be used to connect one of the cables 8 or 9 to the lift link to provide the desired movement and stroke of the lift link 7 to operate the fuel metering device.

The device operates in the following manner. As the foot accelerator 10 is depressed, the shaft 11 is pivoted and the arm 14 raises the push rod 15. The push rod 15 being pivotally connected to the lift arm 7 raises the lift arm to operate the fuel metering device 106 through one of the cables 8 or 9 depending on the fuel metering device used. As the accelerator pedal 10 is released, the return spring 42 withdraws the lift arm 7 causing the push rod 15 to move downwardly. The accelerator pedal moves with the foot as the operator depresses and releases the pedal providing an accurate speed control responsive to the operator's foot movement. The lift arm 7 moves away from the arm 39 of the hand throttle control. A minimum speed can be set by the hand throttle if desired.

The hand throttle lever 23 is connected to the friction plate 22. As the hand throttle is moved forward, the metering device increases the quantity of fuel metered. As it is pulled rearwardly as shown in phantom view 150, the quantity of fuel metered is decreased. The hand lever 23 can be infinitely positioned in any position within the limits of the arc 24. The spring 28 is adjusted by the nut 29 and washer 51 as the friction between the washers 26 and 27 on friction plate 22 is adjusted. The adjustment creates sufficient friction to hold the lever 23 in any one of an infinite number of positions as desired.

As the hand throttle 23 is pivoted, the link 30 moves the bell crank 32 including arm 39. The arm 39 lies immediately beneath the lift arm 7 to cause it to raise when the throttle lever 23 is moved forwardly. This in turn causes the lift arm 7 to raise. When the throttle lever 23 is pulled rearwardly, the lift arm 39 pivots downwardly and the lift arm 7 follows the arm downwardly in response to the return spring 42. Movement of the hand throttle 23 provides a means for setting the throttle at any desired speed.

Each of the bearings 13 and 40 are constructed of bushings which provide sealing. The bushings are fitted to the shaft with a close tolerance, and, accordingly, no opening is permitted in each of the bearing assemblies. The bearing assemblies are a means for supporting of the throttle control and the accelerator control and also provide a noise attenuating device to prevent noise from being transmitted from the engine compartment 52 to the passenger compartment 103.

Conventional throttle mechanisms operate through a push rod device with use of a grommet or some loose fittings encircling the push rod to prevent noise transmission or flow of air through the opening. These grommets and fittings often are loosely fitted around the push rod and due to wear do not provide an adequate seal nor do they provide any sound attenuation. The applicant's device provides an air tight seal which is automatically positioned and aligned once the bearing is welded to the firewall of the tractor. This assures a tight seal between the engine compartment and the passenger compartment and sound attenuation which provides a comfortable operating condition for the operator.

The embodiment of the invention in which an exclusive property or privilege is claimed are defined as follows:

1. A throttle control on a vehicle comprising means including a wall defining an operator station and separating the operator station from an engine compartment, a hand throttle shaft pivotally mounted on and extending through said wall for transmitting throttle movement through said wall, a control linkage including a hand throttle lever connected to said hand throttle shaft, an adjustable fuel metering arm pivotally mounted on said shaft, a lift arm connected to said shaft for lifting said metering arm when said hand throttle lever is operated, an accelerator pedal, an accelerator pedal shaft connected to said accelerator pedal and pivotally mounted on and extending through said wall for transmission of accelerator pedal movement through said wall, a fuel metering control mechanism including said metering arm connected to said hand throttle shaft and said accelerator pedal shaft for selective and alternative operation by said accelerator pedal and said hand throttle lever.

2. A throttle control on a vehicle as set forth in claim 1 including bushing bearings pivotally mounting said throttle shaft and said accelerator shaft to provide sound attenuation from the engine compartment through said wall to said operator station.

3. A throttle control on a vehicle as set forth in claim 1 wherein said wall defines a firewall between said engine compartment and said operator station.

4. A throttle control on a vehicle as set forth in claim 1 including a control console mounted on said wall, means supporting said hand throttle lever on said control console.

5. A throttle control on a vehicle as set forth in claim 1 wherein said fuel metering control mechanism and said adjustable fuel metering arm including means for selectively attaching a fuel metering device at one of a plurality of positions on said metering arm adapted for selective control of the fuel metering device.

6. A throttle control on a vehicle as set forth in claim 1 wherein said throttle control linkage and said hand throttle shaft and fuel metering control mechanism define a bell crank extending through said wall operated by said hand throttle lever to drive a fuel metering mechanism.

7. A throttle control on a vehicle as set forth in claim 1 including an override mechanism comprising, a push rod directly connecting said accelerator pedal with said fuel metering arm of said throttle metering control mechanism, said lift arm directly connected to said hand throttle shaft for lifting said fuel metering arm of said throttle metering control mechanism in the fuel increasing direction only.

8. A throttle control on a vehicle as set forth in claim 1 wherein said throttle control linkage includes a friction plate pivoting with said hand throttle lever, friction means on said wall engaging said plate for retaining said hand throttle lever in any of infinite positions within a predetermined range.

9. A throttle control on a vehicle as set forth in claim 1 wherein said fuel metering control mechanism includes a push rod pivotally connected to said pedal, said fuel metering arm pivotally mounted on said hand throttle shaft on said wall, a return spring for returning said fuel metering arm to a retracted position, said push rod pivotally connected between said pedal and said metering arm for operating said fuel metering device by said pedal, a lift arm connected to said control linkage for lifting said fuel metering arm to increase fuel metering by said hand throttle lever.

10. A throttle control on a vehicle as set forth in claim 1 wherein said wall defines a firewall forming a recess receiving said metering control mechanism, side walls forming said recessed portion of said firewall supporting said hand throttle shaft and said accelerator control shaft.

* * * * *